United States Patent [19]

Lang et al.

[11] Patent Number: 4,699,231
[45] Date of Patent: Oct. 13, 1987

[54] RACK AND PINION AUXILIARY POWER STEERING

[75] Inventors: Armin Lang, Schwäbisch Gmünd; Helmut Knödler, Lorch, both of Fed. Rep. of Germany

[73] Assignee: Zahnradfabrik Friedrichshafen, AG., Friedrichshafen, Fed. Rep. of Germany

[21] Appl. No.: 747,041

[22] Filed: Jun. 14, 1985

[30] Foreign Application Priority Data

Nov. 5, 1983 [LU] Luxembourg ................ 83111057
Oct. 25, 1984 [WO] PCT Int'l Appl. ... PCT/EP84/00333

[51] Int. Cl.$^4$ ............................................. B62D 5/06
[52] U.S. Cl. .................................... 180/148; 91/370; 91/375 R; 91/380
[58] Field of Search ............... 180/148, 149, 142, 132, 180/79; 74/388 PS; 91/370, 371, 372, 373, 375 R, 375 A, 380, 465, 457; 137/596

[56] References Cited

U.S. PATENT DOCUMENTS

| | | |
|---|---|---|
| 2,589,341 | 3/1952 | Chisholm, Jr. et al. ........ 180/149 X |
| 4,294,325 | 10/1981 | Nomura ........................ 180/148 |
| 4,367,672 | 1/1983 | Elser ........................... 91/375 A |

FOREIGN PATENT DOCUMENTS

| | | | |
|---|---|---|---|
| 1111966 | 7/1961 | Fed. Rep. of Germany ...... 180/132 |
| 1129847 | 5/1962 | Fed. Rep. of Germany ...... 180/148 |
| 47252 | 3/1982 | Japan ........................... 180/148 |

*Primary Examiner*—John J. Love
*Assistant Examiner*—Mitchell J. Hill
*Attorney, Agent, or Firm*—Zalkind & Shuster

[57] ABSTRACT

A compact power steering device is provided wherein the power steering valving is actuated by axial movement of a pinion having helical teeth engaging a rack in a steering housing. The valving utilizes head and seat valves with valve heads and coacting valve seats which are actuated on axes parallel to the pinion axis within the housing and requiring no more than the overall distance occupied by axial movement of the pinion as effected by rotation of a steering wheel during steering. Opposed springs effect a centered position for the pinion in neutral position of the valving for straight ahead steering. Thus, a centering spring is dominant and limited in movement to fix the valving as biased by other springs to a precise neutral position.

20 Claims, 3 Drawing Figures

RACK AND PINION AUXILIARY POWER STEERING

The invention relates to a rack and pinion auxiliary power steering device particularly for motor vehicles.

BACKGROUND OF THE INVENTION

German Pat. OS 25 36 894 shows a mechanical steering mechanism in which a steering spindle rotates a helical pinion fixed thereon which engages a rack for transmitting mechanical power to a steering linkage. Owing to the resistance of the wheels on the roadway in the course of steering, the helical pinion on the steering spindle receives a reaction causing it to shift axially in one direction or the other depending upon direction of rotation of the steering spindle. Carried on the steering spindle is an inner valve sleeve having lands and grooves such that the reciprocal movement of the steering spindle effects relative shifting of the inner sleeve to control pressure and exhaust for a power steering servomotor.

The difficulty with the above described construction is due to the length of the housing of the mechanism which requires the valving to be at one end of the steering spindle, thus requiring an increased length of housing for the mechanism. Due to the confining nature of space in automotive vehicles, it is not possible to substitute the overly long construction of the prior art patent for a purely mechanical rack and pinion steering device.

BRIEF DESCRIPTION OF THE PRESENT INVENTION

The invention herein utilizes head and seat type valving encompassing the steering spindle radially arrayed within the axial extend of a helical pinion on the steering spindle, which pinion receives reaction force to cause valving. By such a construction, an auxiliary power steering mechanism can fit into the space allotted for a purely mechanical steering mechanism. Use of head and seat type valves instead of the customary piston or sleeve valves makes possible the use of pressure storage, since head and seat type valves minimize or prevent leakage. Due to such lack of or minimization of leakage, the servopump may be kept very small.

In the present construction using head and seat valves, the steering operates below a certain response threshold just like a standard mechanical steering device. Further, by the use of head and seat valves, sealing rings are unnecessary so that steering effort can be below the hydraulic response threshold without being affected by the friction caused by the sealing rings, aiding in using the least amount of power.

The closing of the head and seat valves in neutral position, that is, for straight ahead steering, is achieved with simple means utilizing springs acting against a positive stop in the housing. A dominant closure spring force is approximately twice as great as the force of the oppositely acting springs for opening the valves.

A definitely defined center position is effected. The head and seat valves have stems driven by a drive plate under bias of the dominant spring means acting on the steering spindle and which dominant spring means acting against a limit stop fixes the center position of the helical pinion on the steering spindle for straight steering.

Inasmuch as in the present invention the head and seat valving are effected by a compact construction requiring only two mechanisms to be actuated via abutment with a drive plate, and since such mechanisms are non-diametrically arranged, a further spring means is utilized acting against the drive plate to compensate for the spring bias on the head and seat valve means for preventing tilting of the drive plate.

A detailed description of the invention now follows in conjunction with the appended drawing, in which.

Figure 1:
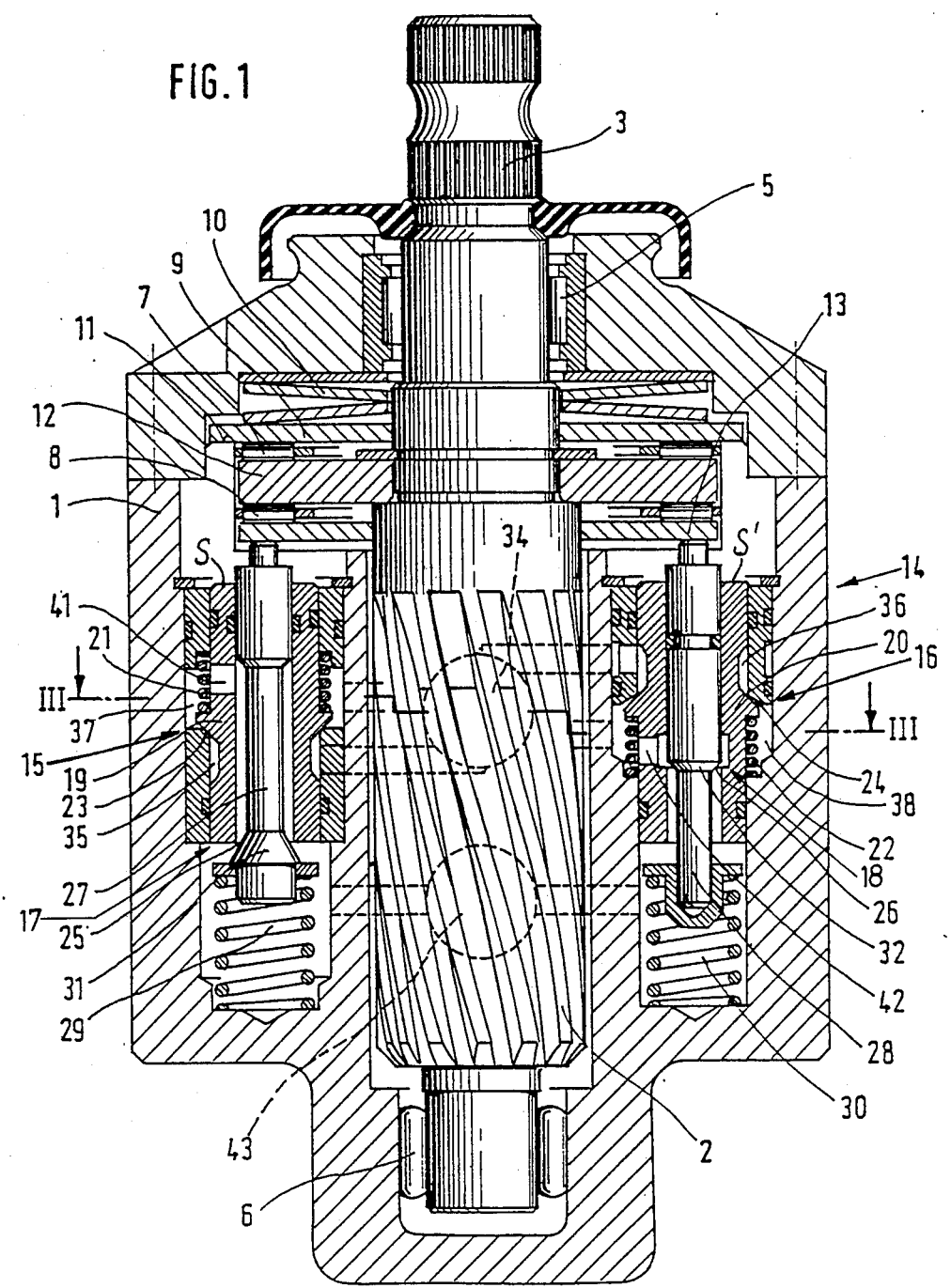
FIG. 1 is a longitudinal section through the rack and pinion mechanism of the invention on the line I—I of FIG. 3, shown in neutral position.

The invention comprises a steering housing 1 wherein is housed a helical pinion 2 rotatively mounted and axially shiftable within certain limits. Pinion 2 at one end is integral with a steering spindle 3 which will be understood to be for coupling to a hand steering wheel (not shown). Pinion 2 engages a rack 4 reciprocal in housing 1 in the usual manner.

Pinion 2 is carried on radial bearings 5 and 6 and supported axially by thrust bearings 7 and 8. A bearing disc 9 biased by disc spring means 10, two discs as shown, is supported on a shoulder 11 of housing 1 to axially fix a central position of pinion 2. The thrust bearing 7 is disposed between the bearing disc or pressure plate 9 and a centering collar 12 secured to pinion 2. The other side of centering collar 12 engages thrust bearing 8, biased by a second spring means (described hereinbelow) through a drive plate 13 to exert a force against the centering collar 12, upwardly.

Oil under pressure from a servopump to a servomotor, neither of which are shown, is controlled by a valve means such as control valving 14 having inlet valve means comprising two inlet head and seat valves 15 and 16 and outlet valve means comprising two outlet head and seat valves 17 and 18. The inlet and outlet valve means have relatively moveable heds and seats wherein relative motion is on axes parallel to the axis of pinion 2. Although the arrangement shown in FIG. 1 discloses combination head and seat arrangements wherein each assembly of the two assemblies of valves and heads shown has dual functions, in that each such assembly has a pair of head and seat combinations, it will be recognized that other head and seat valving constructions are useable in circumferential array aroound the spindle. In any event, for purposes of illustration of the invention, the arrangement as shown in FIG. 1 indicates by arrows 15 and 16 inlet valves comprising a head and seat and by arrows 17 or 18, outlet valves comprising a head and seat, wherein such inlet and outlet valves are compactly structured by being coaxial.

In neutral position for straight ahead steering, the valving 14 has inlet valves 15 and 16 closed. This is effected by having valve heads 19 and 20 biased by respective compression springs 21 and 22 against respective fixed valve seats 23 and 24 in the housing.

Sleeves S and S' have integral valve heads 19 and 20 of the inlet valves 15 and 16, and also have valves seats 25 and 26 for respective outlet valves 17 and 18. The valve heads 31 and 32 of the outlet valves 17 and 18 are formed on respective valve stems 27 and 28 which are biased by respective compression springs 29 and 30 against drive plate 13.

Valve seats 25 and 26 for respective valve heads 31 and 32 are disposed on the sleeves at the ends thereof, as shown, such that in neutral position of valving 14 for straight ahead steering the outlet valves 17 and 18 are open.

It will be clear from FIG. 1, and as heretofore described the valving control 14 encompasses the steering spindle in radial array within the axial extent of the pinion.

Figure 3:
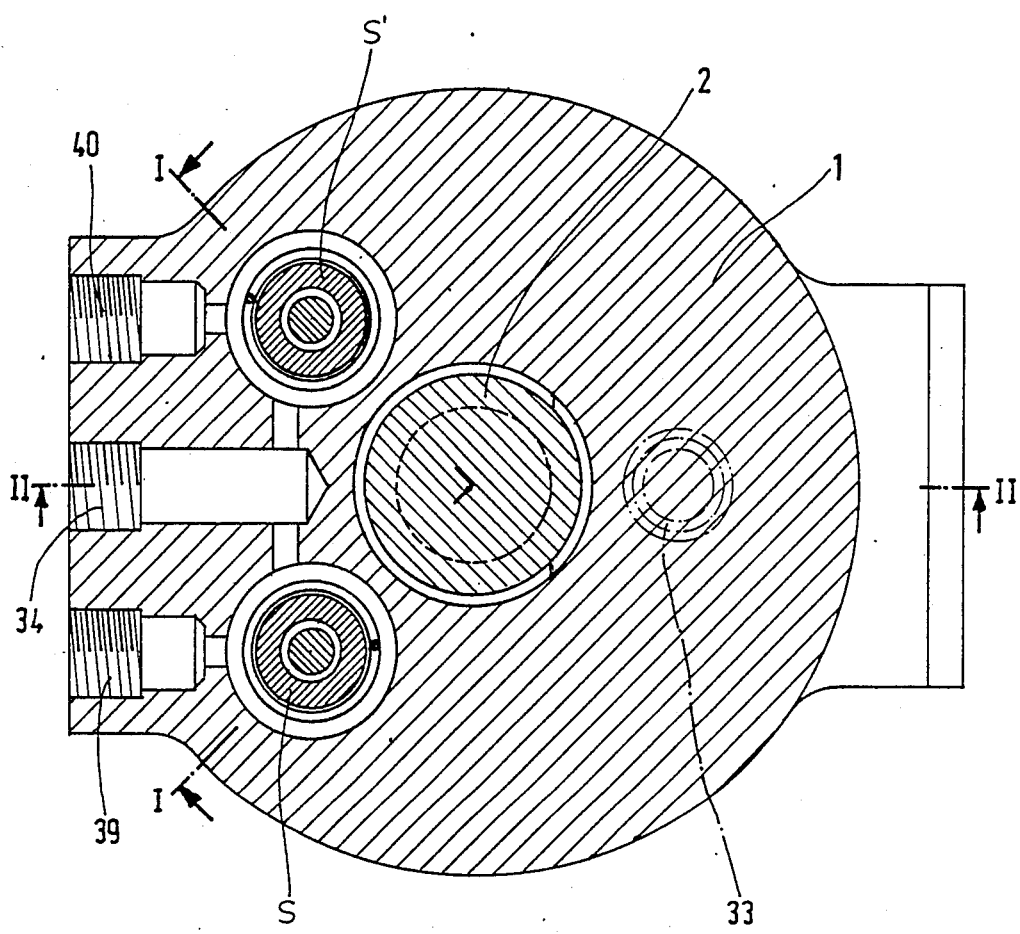
FIG. 3 is a radial section on the line III—III of FIG. 1.

Springs 29 and 30 bias stems 27 and 28 against drive plate 13 and thus also act on centering collar 12 and are balanced by a third compression spring 33, which is seen in FIG. 3, and is located so that any tendency of springs 29 and 30 to tilt drive plate 13 is compensated by the spring 33. Thus, in a simple arrangement three identical springs in triangular array effect a level position of the drive plate which is loaded only in the axial direction without tilting forces.

For the purpose of achieving a precise clearance in centering of pinion 2 in the neutral position of control valving 14 and thus of drive plate 13, the force of the first spring means 10 is approximately twice as much as that of the second spring means comprised of the compression springs 29, 30 and 33. Thus, spring means 10 is dominant to compel centering of pinion 2 during straight travel. However, in a steering movement of pinion 2 upwardly, as viewed on FIG. 1, such movement has the reaction force of pinion 2 against the force of spring means 10 aided by the force of the second spring means 29, 30, 33. In the event of movement of pinion 2 downwardly, only the force of the second spring means resists, which is overcome by the reaction force on pinion 2. Accordingly, equal forces can be active in both directions.

Figure 2:
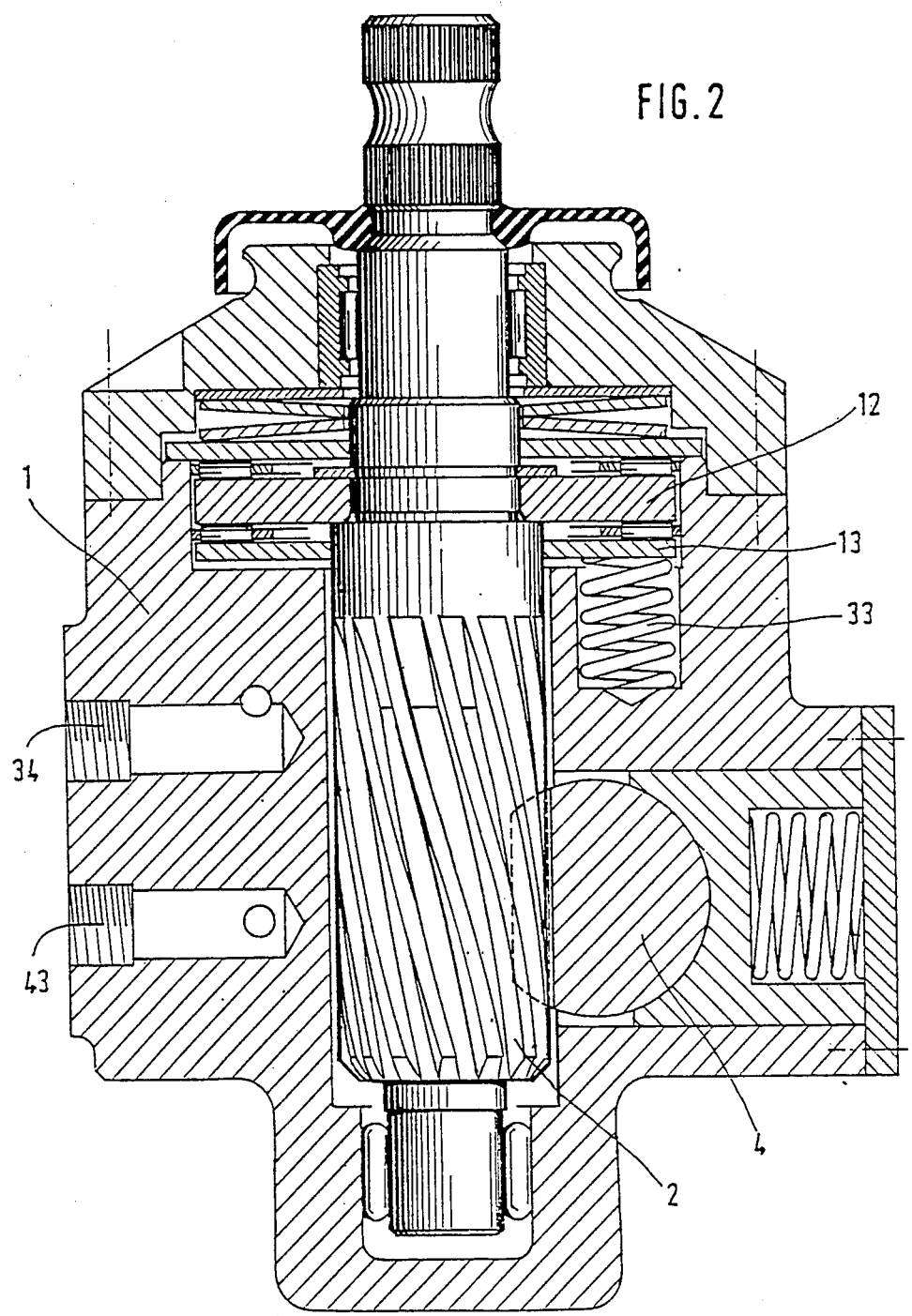
FIG. 2 is a longitudinal section on the line II—II of FIG. 3.

For pressure to be received from the servopump, an inlet port 34 (FIG. 2) is provided connecting by way of suitable passages with inlet chambers 35 and 36 encompassing the respective inlet valves 15 and 16 (FIG. 1). Respective annular chambers 37 and 38 isolated in neutral position as shown from inlet chambers 35 and 36, are connected respectively with servomotor ports 39 and 40. Additionally, annular passages 37 and 38 connect via respective bores 41 and 42 and respective outlet valves 17 and 18, open in the neutral position of the control valve, with a return passage 43.

In operation, in neutral position, the two inlet chambers 35 and 36 are hermetically closed so that no pressure oil flow is wasted. Since ports 39 and 40 which connect to a servomotor are connected in neutral position with the return connection 43, this permits unimpeded return of the mechanical steering linkage operated by the servomotor.

When the steering spindle is rotated in a steering direction wherein helical teeth of pinion 2 produce a force reaction on the pinion in an upward direction, such force remains ineffective until the bias of the first spring 10 has been overcome. After overcoming this marginal force, up to which time steering is accomplished purely mechanically, pinion 2 shifts upwards. As a result of the force of the second spring means comprising compression springs 29, 30 and 33, the valve stems 27 and 28 are likewise shifted upwards and are held in continuous contact against the drive plate 13. At this time, outlet valve 17 closes while outlet valve 18 is opened further. When valve head 31 of outlet valve 17 is fully engaged against valve seat 25 of outlet valve 17, continued movement of stem 27 carries valve head 19 of inlet valve 15 to open inlet valve 15. As a result, pressure oil flows from inlet port 34 via chamber 35, open inlet valve 15, annular space 37 to port 39 (FIG. 3). Port 39 connects with one side of a servomotor, not shown. The other side of the servomotor connects via the port 40 for oil exhaust return to annular space 38, bore 42, open outlet valve 18 to return connection 43, understood to be connected to a tank, not shown.

In the event of rotation of pinion 2 in opposite steering, the pinion is shifted downwards for overcoming the mechanical forces of the compression springs 29, 30 and 33. The control valve 14 operates correspondingly and makes possible pressure oil flow in the opposite direction. In such case, the connecting sequence of the valves 15 through 18 is that outlet valve 18 is closed after which vlve head 20 of inlet valve 16 is carried on valve stem 28 until inlet valve 16 opens.

The other inlet valve 15 remains closed. The other outlet valve 17 remains in its full open position. Pressure oil flow and exhaust return are then reversed for reversed actuation of a servomotor.

SUMMATION

For staight ahead steering, the opposing coaction between the dominant spring means 10 and the second spring means 29, 30, 33 effects a precise centering of the pinion. Thus, the spring means 10 holding drive plate 13 in a fixed position due to engagement of centering collar 12 with shoulder 11 cannot be pushed upwardly due to the lesser force of the springs 29, 30 of second spring means 29, 30, 33.

Accordingly, the inlet and outlet valve means 15, 16, 17, 18 are fixed in position by abutment of the valve stems 27, 28 against the steadily held drive plate 13 rendered immovable by the dominance of spring means 10 acting through the centering collar 12 and the thrust bearings 8, 9.

During steering, upon axial movement of the pinion in either direction the valve heads 19, 20, 31, 32 coact with respective valve seats 23, 24, 25, 26 upon movement of the valve stems relative to respective encompassing sleeves S and S' to control flow to and from respective sides of a power cylinder.

The arrangement of the flow control heads and seats for axial movement parallel to the pinion axis and positioned within the axial extent of the pinion motion, all within the steering housing, effects a compact construction for power steering in a structure requiring no more axial space than a rack and pinion mechanism.

We claim:
1. In a rack and pinion power steering device having an axially shiftable pinion (2) in a steering housing (1) with helical teeth engaging a rack (4) and steering control valving (14) in said housing operable by the shifting of said pinion for pressure and exhaust control of a servomotor booster steering cylinder upon rotation of said pinion by a steering wheel including pressure and exhaust passages in said housing for communicating flow responsive to actuation of said steering control valving to and from the sides of said servomotor;
    including spring means (10) for biasing to a centered position said pinion whereat said steering control valving is in neutral position for straight ahead steering;
    The improvement wherein said steering control valving comprises inlet valve means (15, 16) and outlet valve means (17, 18) and actuator means responsive to shift of said pinion for operating said inlet and outlet valve means;
    said inlet and outlet valve means comprising valve heads (19, 20, 31, 32) and respective valve seats (23,

24, 25, 26) arrayed radially encompassing said pinion in the axial extent of said pinion witin said housing.

2. In a device as set fourth in claim 1, said actuator means comprising a drive plate (13); a second spring means disposed to bias said inlet and outlet valve means against the bias of said first mentioned spring means (10) acting through said drive plate; the bias force of said first mentioned spring means being dominant over that of said second spring means and a motion limit stop (11) for holding said pinion in a centered position to maintain a neutral position of said inlet and outlet valve means for straight ahead steering under the bias force of said first mentioned spring means.

3. In a device as set forth in claim 2, said second spring means comprising at least one pair of springs (25) (29, 30) to respectively actuate said inlet and outlet valve means upon shifting of said pinion against the bias force of said first mentioned spring means during a steering operation; said second spring means comprising at least one additional spring (33) effecting a bias force against said drive plate to ensure axial loading thereof in coaction with said at least one pair of springs.

4. In a device as set forth in claim 2, including a respective valve stem (27, 28) for said inlet and outlet valve means; said drive plate (13) operative on said valve stems responsive to shift of said pinion; said second spring means comprising respective valve stem springs (29, 30) operative to bias said valve stems against said drive plate in opposition to said first mentioned spring means (10) and being dominated thereby to maintain said valve stems in a centered position during straight ahead steering; a respective outlet valve head (31, 32) on each said valve stem; a respective sleeve (S, S') encompassing each said valve stem and comrising a respective valve seat (25, 26) for each said valve head; each said sleeve having an inlet valve head (19, 20); a valve seat (23, 24) in said housing engageable by a respective inlet valve head of said sleeve; means comprising respective sleeve springs (21, 22) maintaining each said sleeve in closed flow neutral position for straight ahead steering with the aid valve heads thereon engaging said respective valve seats in said housing; wherein said sleeves have bores provided with outlet valve seats (25, 26) for engagement by respective said outlet valve heads (31, 32) on respective said valve stems (27, 28) in said neutral position and wherein said outlet valve heads and respective valve seats are open in neutral position; wherein the valve heads and seats of one valve stem and sleeve face in an opposite direction to those of the other valve stem and sleeve so that shift of said pinion in one direction permits a valve stem spring acting on a respective valve stem to effect closure of outlet flow and opening of inlet flow for the sides of a power cylinder while shift of the pinion in the opposite reverses the flow relative the sides of a power cylinder.

5. In a device as set forth in claim 4, wherein the spacing of valve heads and seats of each said valve stems and associated sleeve is such that outlet flow is closed before inlet flow is opened for either side of a servomotor.

6. In a device as set forth in claim 5, wherein the first mentioned spring means (10) dominates the second spring means (29, 30, 33) with approximately twice the bias force.

7. In a device as set forth in claim 3, including valve stems have axes parallel to the axis of said pinion and carrying outlet valve heads (31, 32).

8. In a device as set forth in claim 3, wherein the spacing of valve heads and seats of each said valve means is such that outlet flow is closed before inlet flow is opened for either side of a servomotor.

9. In a device as set forth in claim 3, wherein the first mentioned spring means (10) dominates the second spring means (29, 30, 33) with approximately twice the bias force.

10. In a device as set forth in claim 1, wherein the spacing of valve heads and seats of each said valve means in neutral is such that outlet flow ceases before inlet flow is opened for either side of a servomotor in steering; including a second spring means opposing said first mentioned spring means for actuating said vlve means when said pinion is moved in one axial direction in steering.

11. In a device as set forth in claim 10, wherein the first mentioned spring means (10) dominates the second spring means with approximately twice the bias force thereof for maintaining a neutral position of said inlet and outlet valve means during straight ahead steering.

12. In a device as set forth in claim 1, wherein the spacing of valve heads and seats of each said valve means in neutral position is such that outlet flow ceases before inlet flow is opened for either side of a servomotor in steering; said valve heads and seats having relative linear movement parallel to the axis of said pinion.

13. In a rack and pinion power steering control device for a double acting servomotor, having a housing with an axially shiftable pinion having helical teeth engaging a rack wherein said pinion is bidirectionally shifted responsive to direction of manual rotation for respective directions of steering of a vehicle; the improvement comprising inlet and outlet valve means (15, 16) (17, 18) for each side of the servomotor and being disposed within said housing located radially of said pinion and extending along the length thereof and having valve heads and respective valve seats
having relative movement parallel to the axis of said pinion for flow control; including actuator means comprising a drive means connected to be moved by said pinion and engageable with said valve means for effecting said relative movement of said respective valve heads and seats.

14. In a rack and pinion device as set forth in claim 13, including spring means (10) for biasing said pinion to a center position whereat said inlet and outlet valve means is in neutral position for straight ahead steering; said actuator means comprising a drive plate (13); a second spring means disposed to bias said inlet and outlet valve means against the bias of said first mentioned spring means (10) acting through said drive plate; the bias force of said first mentioned spring means being dominant over that of said second spring means and means comprising a motion limit stop (11) for holding said pinion in a fixed center position to maintain a neutral positon of said inlet and outlet valve means for straight ahead steering under the bias force of said first mentioned spring means.

15. In a rack and pinion device as set forth in claim 14, said second spring means comprising at least one pair of springs (29, 30) respectively disposed to directly actuate said inlet and outlet valve means upon shifting of said pinion against the bias force of said first mentioned spring means during a steering operation; said second spring means comprising at least one additional spring (33) effecting a bias force against said drive plate to ensure axial loading thereof in coaction with said at lest one pair of springs.

16. In a device as set forth in claim 15, including valve stems have axes parallel to the axis of said pinion and carrying outlet valve heads.

17. In a device as set forth in claim 16, wherein the spacing of valve heads and seats of each said valve means is such that outlet flow is closed before inlet flow is opened for either side of a servomotor.

18. In a device as set forth in claim 17, wherein the first mentioned spring means (10) dominates the second spring means (29, 30, 33) with approximately twice the bias force.

19. In a device as set forth in claim 18, wherein the valve heads and valve seats comprise valve stems and encompassing sleeves having relative axial movement.

20. In a device as set forth in claim 13, said drive means comprising a centering collar (12) secured to said pinion; a pressure plate (9) engaged by said first mentioned spring means (10); a thrust bearing (7) intermediate said pressure plate and said centering collar; a drive plate (13) and a thrust bearing (8) intermediate said centering collar and said drive plate; said drive plate being operable to actuatingly engage said valve means.

* * * * *